United States Patent
Yamamoto et al.

(10) Patent No.: US 7,550,552 B2
(45) Date of Patent: Jun. 23, 2009

(54) PROCESS FOR PRODUCING POLYBUTYLENE TEREPHTHALATE

(75) Inventors: Masanori Yamamoto, Yokkaichi (JP); Toshiyuki Hamano, Yokkaichi (JP); Shinichiro Matsuzono, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 55 days.

(21) Appl. No.: 10/594,676

(22) PCT Filed: Apr. 28, 2005

(86) PCT No.: PCT/JP2005/008209

§ 371 (c)(1), (2), (4) Date: Aug. 1, 2007

(87) PCT Pub. No.: WO2005/108462

PCT Pub. Date: Nov. 17, 2005

(65) Prior Publication Data

US 2008/0081886 A1    Apr. 3, 2008

(30) Foreign Application Priority Data

May 10, 2004 (JP) ............................. 2004-140366

(51) Int. Cl.
*C08G 63/00* (2006.01)
(52) U.S. Cl. .................................................. 528/271
(58) Field of Classification Search ................... 528/73, 528/271, 279
See application file for complete search history.

(56) References Cited

U.S. PATENT DOCUMENTS

| 3,801,547 | A | * | 4/1974 | Hoeschele | 528/301 |
| 4,329,444 | A | * | 5/1982 | Borman | 528/279 |
| 4,499,261 | A | * | 2/1985 | Heinze et al. | 528/279 |
| 4,656,241 | A | * | 4/1987 | Iida et al. | 528/279 |

FOREIGN PATENT DOCUMENTS

| JP | 2003-73466 | 3/2003 |
| JP | 2004-68001 A | 3/2004 |

OTHER PUBLICATIONS

International Search Report of PCT/JP2005/008209, mailed Jun. 7, 2005.

\* cited by examiner

*Primary Examiner*—Randy Gulakowski
*Assistant Examiner*—Shane Fang
(74) *Attorney, Agent, or Firm*—Nixon & Vanderhye P.C.

(57) ABSTRACT

Polybutylene terephthalate is produced by continuously subjecting terephthalic acid and 1,4-butanediol to an esterification reaction in the presence of a titanium compound catalyst using one-stage or plural-stage esterification reaction vessel(s) and then subjecting the resultant reaction product to a polycondensation reaction, wherein the esterification reaction between terephthalic acid and 1,4-butanediol is conducted in the presence of a titanium compound having a specific concentration under a specific pressure at a specific molar ratio between the raw materials. The process avoids undesirable side reactions by continuously conducting esterification reaction using terephthalic acid as a raw material, and can minimize loss of raw materials.

15 Claims, 7 Drawing Sheets

PROCESS FOR PRODUCING POLYBUTYLENE TEREPHTHALATE

This application is the US national phase of International application PCT/JP2005/008209 filed 28 Apr. 2005, which designated the U.S. and claims priority of JP 2004-140366, filed 10 May 2004, the entire contents of each of which are hereby incorporated by reference.

TECHNICAL FIELD

The present invention relates to a process for producing polybutylene terephthalate, and more particularly, to a process for producing polybutylene terephthalate having excellent color tone and transparency as well as a less content of impurities, which can be prevented from undergoing undesirable side reactions upon continuously conducting esterification reaction using terephthalic acid as a raw material, and can minimize loss of raw materials.

BACKGROUND ARTS

Polybutylene terephthalate as typical engineering plastic among thermoplastic polyester resins has been extensively used as a raw material of injection-molded products such as automobile parts, electric and electronic parts and precision equipment parts because of easiness of molding as well as excellent mechanical properties, heat resistance, chemical resistance, aroma-retention property and other physical and chemical properties. In recent years, there is a tendency that polybutylene terephthalate is also used in more extensive applications such as films, sheets, monofilaments and fibers owing to the above excellent properties.

The polybutadiene terephthalate has been usually produced from terephthalic acid or dimethyl terephthalate and 1,4-butanediol as raw materials. In recent years, from the standpoints of high efficiency of use of raw materials, facilitated recovering treatment of by-produced low-molecular weight substances and good availability of the raw materials, there has been employed a so-called direct polymerization method using terephthalic acid and 1,4-butanediol as the raw materials. In particular, from the standpoints of stable quality of products, miniaturization in size of production facilities and good energy efficiency, there has been noticed a direct continuous polymerization method, in which these raw materials are continuously supplied to continuously obtain the products.

In the direct polymerization method, in general, after terephthalic acid is esterified with an excess amount of 1,4-butanediol to obtain an oligomer, the oligomer is polymerized through a polycondensation reaction stage while removing the excessive 1,4-butanediol incorporated into a molecule of the oligomer as well as water produced in the condensation reaction under reduced pressure, thereby producing polybutylene terephthalate. In many cases, in order to accelerate the esterification reaction at an early stage of the process and prevent generation of tetrahydrofuran by side reactions, a titanium compound has been used as a catalyst (for example, Japanese Patent Application Laid-Open (KOKAI) No. 48-47594 (1973)).

However, it is known that the titanium compound tends suffer from problems such as partial deactivation thereof in the course of the esterification reaction and production of impurities, resulting in poor transparency of the obtained products (for example, Japanese Patent Application Laid-Open (KOKAI) No. 2002-284868). The problems tend to become more remarkable in the case of a continuous method (for example, Japanese Patent Application Laid-Open (KOKAI) No. 2002-284870).

In addition, since the titanium compound deactivated in the esterification reaction stage still remains even in the subsequent polycondensation stage, in order to produce polybutylene terephthalate having a desired molecular weight, it is inevitably required to strictly control the polycondensation reaction conditions by raising the reaction temperature or reducing the reaction pressure. However, the use of the high temperature leads to poor color tone of the obtained polymer as well as increase in end carboxyl group concentration thereof, whereas the use of the low pressure requires a very excessive facility capable of achieving the low pressure. Meanwhile, a large amount of the titanium compound is used in order to replenish the deactivated titanium compound, and as a result, the amount of the titanium compound deactivated is correspondingly increased, so that the above problems rather tend to be further accelerated.

On the other hand, in the esterification reaction stage of the direct polymerization method, in order to avoid loss of the raw 1,4-butanediol, it is important to effectively prevent the side reaction in which tetrahydrofuran is produced from 1,4-butanediol. The reaction in which tetrahydrofuran is produced from 1,4-butanediol, tends to be readily caused in the presence of an acid catalyst. Therefore, in the direct polymerization method in which the terephthalic acid is always present in the reaction system, it is very important to increase the velocity of the esterification reaction between terephthalic acid and 1,4-butanediol as a forward reaction. As a useful method for solving this problem, there has been proposed a method of adding a titanium compound to the esterification reaction system (for example, "Journal of Japan Institute of Fibers", vol. 43, No. 1, p. 35). Meanwhile, in this case, it is considered that the by-production of tetrahydrofuran can be prevented because the titanium compound added exhibits not the effect of preventing conversion of 1,4-butanediol into tetrahydrofuran, but the effect of accelerating the forward reaction.

Also, since the velocity of the side reaction of by-producing tetrahydrofuran depends upon the concentration of 1,4-butanediol, there has been proposed a method of deceasing the amount of the by-produced tetrahydrofuran by decreasing the concentration of 1,4-butanediol in the esterification reaction system (for example, Japanese Patent Application Laid-Open (KOKAI) Nos. 2002-284868 and 2002-284870).

However, the decreased concentration of 1,4-butanediol in the esterification reaction system also tends to cause lowering in velocity of the esterification reaction between terephthalic acid and 1,4-butanediol as the forward reaction. As described above, the side reaction of producing tetrahydrofuran from 1,4-butanediol tends to be readily caused in the presence of an acid catalyst. As a result, even though it is attempted to conduct the forward esterification reaction until reaching a desired conversion rate (esterification conversion), the amount of the by-produced tetrahydrofuran cannot be reduced as desired. Further, the resultant product tends to still exhibit a high solution haze due to deactivation of the catalyst.

On the other hand, in the esterification reaction, it has also been attempted to accelerate the forward reaction by using the titanium compound at a high concentration in order to decrease the amount of the by-produced tetrahydrofuran while maintaining a relatively high concentration of 1,4-butanediol (for example, Japanese Patent Application Laid-Open (KOKAI) No. 62-195017 (1987)).

Meanwhile, it is considered that the deactivation of the titanium compound is caused by transformation of the titanium compound into a higher-molecular weight compound thereof by the effect of water or terephthalic acid. Since the deactivation reaction tends to be accelerated by increased concentration of the titanium compound, in the case where the titanium compound is used at a high concentration as proposed in the above conventional method, the deactivation reaction thereof tends to be inevitably caused, thereby still failing to solve the above problems such as production of impurities and poor transparency. In addition, in such a conventional method, since the catalyst is unremoved in production of the polybutylene terephthalate, a whole amount of the titanium compound used in the esterification reaction is mixed in the obtained polybutylene terephthalate product, thereby inevitably causing problems such as discoloration and poor heat stability of the resultant product due to catalyst residues.

Further, there have been proposed a method of controlling the amount of an organotitanium compound added upon production of the polybutylene terephthalate, and allowing an organotin compound to co-exist in the early esterification reaction stage (for example, Japanese Patent Application Laid-Open (KOKAI) Nos. 2002-284868 and 10-330469 (1998)), and a method of decreasing impurities or haze due to the catalyst by dividing the esterification reaction of continuously reacting terephthalic acid with 1,4-butanediol into two stages, wherein the organotin compound is supplied only to the first esterification reaction stage, and the organotitanium compound is further supplied to the second esterification reaction stage (for example, Japanese Patent Application Laid-Open (KOKAI) No. 10-330468 (1998)).

However, the above conventional methods still fail to solve the problems concerning impurities and haze, and rather have such a problem that the addition of the organotin compound tends to cause deterioration in color tone of the obtained polybutylene terephthalate.

As described above, in any of the conventional direct continuous polymerization methods for producing the polybutylene terephthalate, it has been difficult to prevent deactivation of the titanium compound and simultaneously decreasing the amount of the by-produced tetrahydrofuran in the early esterification reaction stage.

DISCLOSURE OF THE INVENTION

Subject to be Solved by the Invention

The present invention has been conducted for solving the above conventional problems. An object of the present invention is to provide a process for producing polybutylene terephthalate having excellent color tone, transparency and quality stability as well as a less content of impurities while preventing loss of raw materials.

Means for Solving the Subject

As a result of the present inventors' earnest studies for solving the above problems, it has been found that when the esterification reaction between terephthalic acid and 1,4-butanediol is conducted in the presence of a titanium compound having a specific concentration under a specific pressure at a specific molar ratio between the raw materials, the amount of the titanium compound catalyst deactivated can be remarkably lessened, thereby readily overcoming the above conventional problems. The present invention has been attained on the basis of the above finding.

To accomplish the aim, in a first aspect of the present invention, there is provided a process for producing polybutylene terephthalate comprising the steps of continuously subjecting terephthalic acid and 1,4-butanediol to esterification reaction in the presence of a titanium compound catalyst using one-stage or plural-stage esterification reaction vessel(s) and then subjecting the resultant reaction product to polycondensation reaction, the process satisfying the following requirements (A) to (C):

(A) a pressure (P) in at least one of the esterification reaction vessels being 20 to 90 kPa;

(B) a concentration of the titanium compound catalyst used in the esterification reaction being not more than 90 ppm, calculated as a concentration ($\alpha$) by weight of titanium atom, based on the weight of the polybutylene terephthalate finally produced; and (C) the following formulae (I) and (II) being satisfied:

$$\beta = BM/TM - 0.03 \times \alpha + 0.045 \times P \tag{I}$$

$$\beta = 4.0 \text{ to } 7.0 \tag{II}$$

wherein TM is the number of moles of terephthalic acid supplied to the esterification reaction vessels per unit time; BM is the number of moles of whole 1,4-butanediol supplied to the esterification reaction vessels per unit time; $\alpha$ is a concentration (unit: ppm) of the titanium catalyst used in the esterification reaction (calculated a concentration by weight of titanium atom based on the finally produced PBT); and P is a pressure (unit: kPa) in at least one of the esterification reaction vessels.

EFFECT OF THE INVENTION

According to the present invention, there is provided PBT having excellent color tone and transparency as well as a less content of impurities, which can be produced while preventing undesirable side reactions, and is suitably used in applications such as films, monofilaments, fibers, electric and electronic parts, automobile parts, etc.

EXPLANATION OF REFERENCE NUMBER

Figure 1:
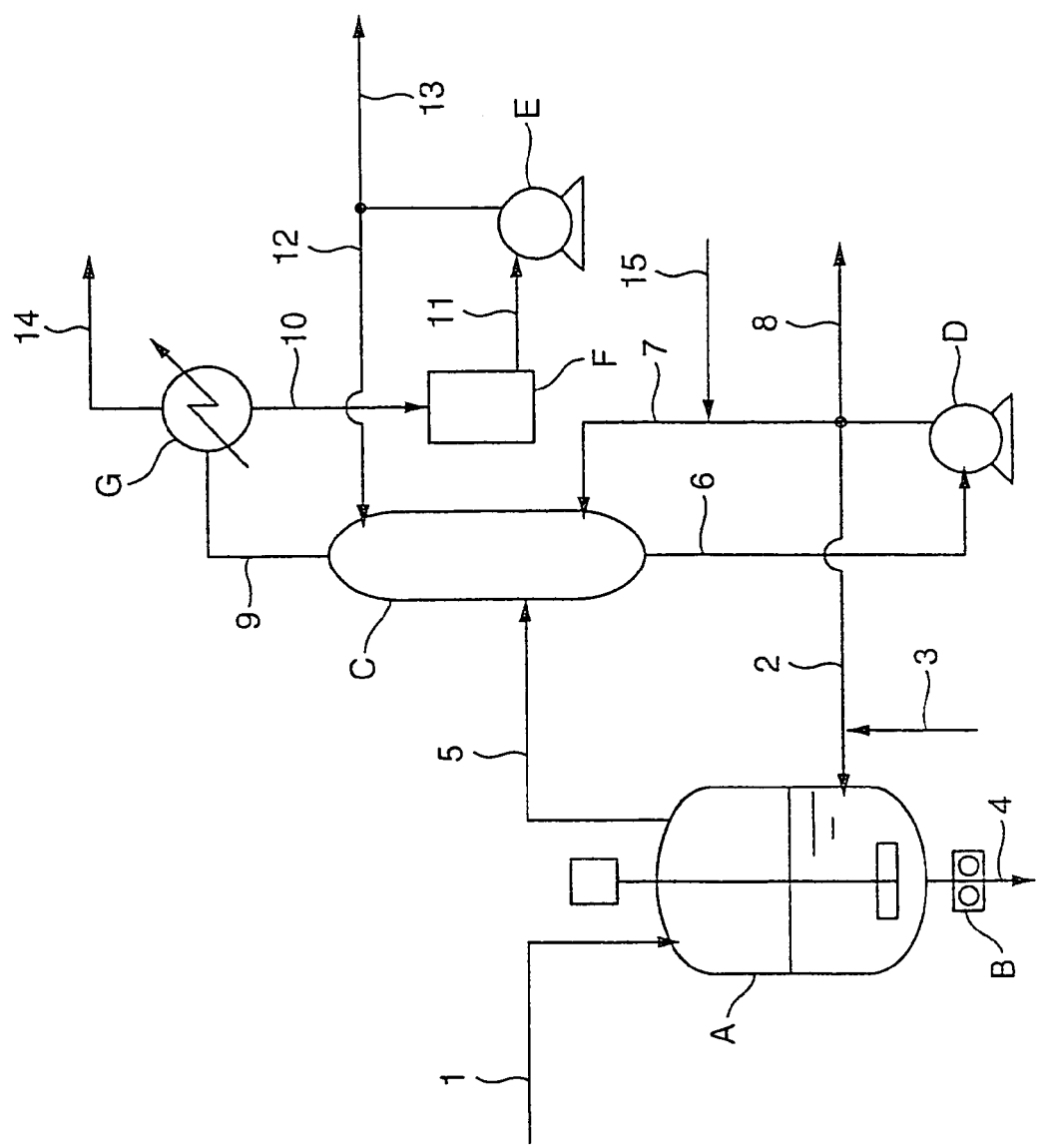
FIG. 1 is an explanatory view showing an example of an esterification reaction process used in the present invention.

1: Raw material feed line
2: Recirculation line
3: Catalyst feed line
4: Discharge line
5: Distillate line
6: Discharge line
7: Circulation line
8: Discharge line 9: Gas discharge line
10: Condensate line
11: Discharge line
12: Circulation line
13: Discharge line
14: Vent line
15: Additional supplying or a recovery line
16: Bypass line
A: Reaction vessel
B: Discharge pump
C: Rectifying column
D and E: Pump
F: Tank
G: Condenser
H: Reboiler
L1: Discharge line
L3 and L5: Discharge line
L2, L4 and L6: Vent line
a: First polycondensation reaction vessel
d: Second polycondensation reaction vessel
k: Third polycondensation reaction vessel
c, e and m: Discharging gear pump
f: Filter
g: Die head
h: Rotary cutter

BEST MODE FOR CARRYING OUT THE INVENTION

The present invention is described in detail below. The preferred embodiments of the present invention as described below are only typical and illustrative, and, therefore, the present invention is not limited thereto.

The polybutylene terephthalate of the present invention (hereinafter referred to merely as "PBT") is a polymer having a structure including ester bonds between terephthalic acid units and 1,4-butanediol units, in which not less than 50 mol % of dicarboxylic acid units constituting the polybutylene terephthalate are composed of the terephthalic acid units, and not less than 50 mol % of diol units constituting the polybutylene terephthalate are composed of the 1,4-butanediol units. The terephthalic acid units are contained in an amount of preferably not less than 70 mol %, more preferably not less than 80 mol %, still more preferably not less than 95 mol % based on the whole dicarboxylic acid units, and the 1,4-butanediol units are contained in an amount of preferably not less than 70 mol %, more preferably not less than 80 mol %, still more preferably not less than 95 mol % based on the whole diol units. When the content of the terephthalic acid units or the 1,4-butanediol units is less than 50 mol %, the resultant PBT tends to be deteriorated in crystallization velocity, resulting in poor moldability thereof.

In the present invention, the dicarboxylic acid components other than terephthalic acid are not particularly limited. Examples of the dicarboxylic acid components other than terephthalic acid may include aromatic dicarboxylic acids such as phthalic acid, isophthalic acid, 4,4'-diphenyldicarboxylic acid, 4,4'-diphenyletherdicarboxylic acid, 4,4'-benzophenonedicarboxylic acid, 4,4'-diphenoxyethanedicarboxylic acid, 4,4'-diphenylsulfonedicarboxylic acid and 2,6-naphthalenedicarboxylic acid; alicyclic dicarboxylic acids such as 1,2-cyclohexanedicarboxylic acid, 1,3-cyclohexanedicarboxylic acid and 1,4-cyclohexane dicarboxylic acid; and aliphatic dicarboxylic acids such as malonic acid, succinic acid, glutaric acid, adipic acid, pimelic acid, suberic acid, azelaic acid and sebacic acid. These dicarboxylic acid components may be introduced into the polymer skeleton using dicarboxylic acids themselves or dicarboxylic acid derivatives such as dicarboxylic acid esters and dicarboxylic acid halides as raw materials.

In the present invention, the diol components other than 1,4-butanediol are not particularly limited. Examples of the diol components other than 1,4-butanediol may include aliphatic diols such as ethylene glycol, diethylene glycol, polyethylene glycol, 1,2-propanediol, 1,3-propanediol, polypropylene glycol, polytetramethylene glycol, dibutylene glycol, 1,5-pentanediol, neopentyl glycol, 1,6-hexanediol and 1,8-octanediol; alicyclic diols such as 1,2-cyclohexanediol, 1,4-cyclohexanediol, 1,1-cyclohexane dimethylol and 1,4-cyclohexane dimethylol; and aromatic diols such as xylylene glycol, 4,4'-dihydroxybiphenyl, 2,2-bis(4-hydroxyphenyl) propane and bis(4-hydroxyphenyl)sulfone.

In the present invention, as comonomers copolymerizable with the dicarboxylic acid components and the diol components, there may also be used monofunctional components such as hydroxycarboxylic acids, e.g., lactic acid, glycolic acid, m-hydroxybenzoic acid, p-hydroxybenzoic acid, 6-hydroxy-2-naphthalenecarboxylic acid and p-β-hydroxyethoxybenzoic acid, alkoxycarboxylic acids, stearyl alcohol, benzyl alcohol, stearic acid, benzoic acid, t-butylbenzoic acid and benzoylbenzoic acid; and tri- or more polyfunctional components such as tricarballylic acid, trimellitic acid, trimesic acid, pyromellitic acid, gallic acid, trimethylol ethane, trimethylol propane, glycerol and pentaerythritol.

In the present invention, terephthalic acid and 1,4-butanediol used as main raw materials, are continuously subjected to esterification reaction in the presence of the titanium compound catalyst, thereby obtaining an oligomer, and then the obtained oligomer is subjected to polycondensation reaction, thereby obtaining PBT.

Specific examples of the titanium compound as a catalyst may include inorganic titanium compounds such as titanium oxide and titanium tetrachloride; titanium alcoholates such as tetramethyl titanate, tetraisopropyl titanate and tetrabutyl titanate; and titanium phenolates such as tetraphenyl titanate. Among the titanium compounds, preferred are tetraalkyl titanates. Of these titanium compounds, more preferred is tetrabutyl titanate.

In addition to titanium compound, tin compound may be used as a catalyst. Specific examples of the tin compound may include dibutyl tin oxide, methylphenyl tin oxide, tetraethyl tin, hexaethyl ditin oxide, cyclohexahexyl ditin oxide, didodecyl tin oxide, triethyl tin hydroxide, triphenyl tin hydroxide, triisobutyl tin acetate, dibutyl tin diacetate, diphenyl tin dilaurate, monobutyl tin trichloride, tributyl tin chloride, dibutyl tin sulfide, butylhydroxy tin oxide, methylstannoic acid, ethylstannoic acid and butylstannoic acid.

The tin tends to deteriorate a color tone of the resultant PBT. Therefore, the amount of the tin added is usually not more than 200 ppm, preferably not more than 100 ppm, more preferably not more than 10 ppm, calculated as a tin atom. Most preferably, no tin is added to the PBT.

Also, in addition to the above catalysts, there may also be used a reaction aid or a co-catalyst, e.g., magnesium compounds such as magnesium acetate, magnesium hydroxide, magnesium carbonate, magnesium oxide, magnesium alkoxide and magnesium hydrogen phosphate; calcium compounds such as calcium acetate, calcium hydroxide, calcium carbonate, calcium oxide, calcium alkoxide and calcium hydrogen phosphate; antimony compounds such as antimony trioxide; germanium compounds such as germanium dioxide and germanium tetraoxide; manganese compounds; zinc compounds; zirconium compounds; cobalt compounds; phosphorus compounds such as orthophosphoric acid, phosphorous acid, hypophosphorous acid, polyphosphoric acid and esters or metal salts of these compounds; sodium hydroxide; and sodium benzoate.

The concentration of the titanium compound used in the esterification reaction according to the present invention is not more than 90 ppm (calculated as a concentration ($\alpha$) by weight of a titanium atom), based on the weight of polybutylene terephthalate finally produced.

In the present invention, the lower limit of the titanium content ($\alpha$) is usually 20 ppm, preferably 25 ppm, more preferably 30 ppm, still more preferably 35 ppm, whereas the upper limit of the titanium content ($\alpha$) is usually 80 ppm, preferably 60 ppm, more preferably 50 ppm, still more preferably 40 ppm. When the concentration of the titanium compound is too high, the titanium compound tends to be deactivated in the esterification reaction, resulting in deterioration in color tone or haze of the obtained product as well as increase in impurities therein. When the concentration of the titanium compound is too low, there tend to be caused problems such as increase in amount of the by-produced tetrahydrofuran (hereinafter occasionally referred to merely as "THF") and deterioration in polycondensation reactivity.

The contents of the titanium atom, etc. in the resultant polybutylene terephthalate may be determined by recovering these metals from the polymer by the method such as wet-ashing, and then measuring the amounts of the metals by the methods such as atomic emission spectrometric method, atomic absorption spectrometric method and inductively coupled plasma (ICP) method.

In the present invention, the esterification reaction may be conducted using one-stage vessel or plural-stage reaction vessels. Among them, in order to inhibit from becoming an excessive facilities, one reaction vessel in one stage is preferably used in the esterification reaction system. Also, as the esterification reaction vessel, there are preferably used reaction vessels equipped with a stirrer. Specific examples of the reaction vessels equipped with a stirrer may include vertical agitation complete mixing tanks, vertical thermal convection-type mixing tanks, tower-type continuous reaction vessels, etc. As the stirrer, there may be used conventionally known stirrers including not only ordinary type stirring apparatuses constituted from a power section, a bearing, an axis and agitation blades, but also high-speed rotation type stirring apparatuses such as turbine-stator type high-speed rotating stirrers, disk mill type stirrers and rotor mill type stirrers.

The stirring method is not particularly limited. In the present invention, there may be used not only ordinary stirring methods in which the reaction solution is directly stirred at upper, lower and side portions of the reaction vessel, but also the method of discharging a part of the reaction solution out of the reaction vessel through a conduit, etc., stirring the solution using a line mixer, etc., and then circulating the reaction solution to the reaction vessel.

The kinds of agitation blades may be appropriately selected from known blades. Specific examples of the agitation blades may include propeller blades, screw blades, turbine blades, fan turbine blades, disk turbine blades, Faudler blades, Full zone blades, Maxblend blades, etc.

In the present invention, the esterification reaction vessels and polycondensation reaction vessels are defined and distinguished from each other as follows. That is, reaction vessels in which an esterification conversion of oligomer represented by the following formula (III) as measured at an inlet thereof is not more than 90%, are defined as the esterification reaction vessels, whereas those in which the same esterification conversion is more than 90% are defined as the polycondensation reaction vessels.

Esterification conversion=[(Saponification Value)−(Acid Value)]/(Saponification Value)×100    (III)

wherein "acid value" represents the value determined by subjecting a solution prepared by dissolving the oligomer in dimethyl formamide to titration with alkali; and "saponification value" represents the value determined by hydrolyzing the oligomer with alkali and then subjecting the hydrolyzed reaction solution to back titration with acid.

The esterification reaction pressure used in the present invention is required to be 20 to 90 kPa in at least one reaction vessel. The esterification reaction pressure is preferably 30 to 75 kPa, more preferably 35 to 70 kPa, still more preferably 40 to 70 kPa, further still more preferably 50 to 70 pKa.

When the esterification reaction pressure is less than 20 kPa, the concentration of 1,4-butanediol in the reaction system tends to be lowered, resulting in such a tendency that the degree of deactivation of the titanium compound catalyst is increased. When the esterification reaction pressure is more than 90 kPa, the concentration of 1,4-butanediol in the reaction system tends to be increased, resulting in increase in not only amount of by-produced THF but also water content in the reaction system. As a result, the deactivation of the titanium compound tends to be inevitably caused.

The process of the present invention is required to satisfy the formulae (I) and (II):

$$\beta = BM/TM - 0.03 \times \alpha + 0.045 \times P \qquad (I)$$

$$\beta = 4.0 \text{ to } 7.0 \qquad (II)$$

wherein TM is the number of moles of terephthalic acid supplied to the esterification reaction vessels per unit time; BM is the number of moles of whole 1,4-butanediol supplied to the esterification reaction vessels per unit time; $\alpha$ is a concentration (unit: ppm) of the titanium compound catalyst used in the esterification reaction (calculated as a concentration by weight of titanium atom based on the finally produced PBT); and P is a pressure (unit: kPa) in the respective esterification reaction vessels.

The formulae (I) and (II) show optimum conditions of the esterification reaction vessel, which are required to prevent deactivation of the titanium compound catalyst in the esterification reaction, and minimize the amount of by-produced THF in the process for producing PBT by continuously esterifying terephthalic acid and 1,4-butanediol as raw materials with each other. The formulae (I) and (II) are established on the basis of such a finding that the deactivation of the titanium compound catalyst is more effectively prevented, the lower the concentration of the titanium compound used in the esterification reaction, the higher is the concentration of 1,4-butanediol and the lower the water concentration.

The number of moles (TM) of terephthalic acid supplied per unit time means the number of moles of terephthalic acid supplied as a raw material usually in the form of a slurry mixture with 1,4-butanediol, and is generally proportional to the amount of PBT produced per unit time.

On the other hand, the number of moles (BM) of whole 1,4-butanediol supplied to the respective esterification reaction vessels per unit time means a sum of 1,4-butanediols introducing from outside into the respective reaction vessels, including 1,4-butanediol supplied together with terephthalic acid in the form of a raw slurry as well as 1,4-butanediol supplied independently of the terephthalic acid, and 1,4-butanediol used as a solvent for the catalyst. In the case where a plurality of the esterification reaction vessels are used, the BM is a total amount of 1,4-butanediols introducing from outside into the respective esterification reaction vessels. In the direct polymerization method in which terephthalic acid is reacted with an excess amount of 1,4-butanediol, the BM may be basically controlled independently of the amount of PBT produced.

The pressure (P) in the esterification reaction vessel is defined as follows. That is, in the case where only one esterification reaction vessel is used in the reaction system, the pressure (P) means the pressure thereof. In the case where a plurality of the esterification reaction vessels are used and two or more thereof satisfy the pressure range of 20 to 90 kPa, the lowest pressure thereof is defined as the pressure (P). In the case where a plurality of the esterification reaction vessels are used and only one thereof satisfies the pressure range of 20 to 90 kPa, the pressure (P) means the pressure thereof.

The $\beta$ value is usually 4.0 to 7.0, preferably 4.5 to 6.5, more preferably 5.0 to 6.0. When the $\beta$ value is less than 4.0, the titanium compound tends to be more deactivated. When the $\beta$ value is more than 7.0, the amount of THF by-produced tends to be increased, and the amount of 1,4-butanediol vaporized in the respective esterification reaction vessels tends to be increased, resulting in disadvantageous process from the standpoint of energy loss.

In particular, the lower limit of BM/TM is preferably 2.1, more preferably 2.5, still more preferably 3.1, most preferably 3.3, whereas the upper limit of BM/TM is preferably 6.5, more preferably 6.0, still more preferably 5.5, most preferably 5.0. When the value of BM/TM is too low, the titanium compound tends to be more deactivated. When the value of BM/TM is too high, the amount of THF by-produced tends to be increased, resulting in disadvantageous process from the standpoint of energy loss.

Also, the esterification reaction temperature is preferably not less than a boiling point of 1,4-butanediol in at least one esterification reaction vessel in order to shorten the reaction time. The boiling point of 1,4-butanediol varies depending upon the reaction pressure, and is usually 205° C. under a pressure of 50 kPa.

In particular, in order to maintain the suitable reaction velocity and prevent occurrence of discoloration and side reactions, the esterification reaction temperature is usually 180 to 260° C., preferably 200 to 240° C., more preferably 210 to 235° C. In the case where a plurality of the esterification reaction vessels are used, more preferred is that at least one of the esterification reaction vessels is kept in a temperature of 210 to 235° C.

The esterification reaction time is not particularly limited. However, when the esterification reaction time is too long, the amount of THF by-produced tends to be increased, and the oligomer produced tends to suffer from coloration and deterioration. Therefore, the average residence time based on terephthalic acid units in the respective esterification reaction vessels is usually 0.5 to 12 hours, preferably 1 to 8 hours, more preferably 2 to 6 hours.

As to the number-average degree of oligomerization produced in the process of the present invention, the oligomer is preferably in the form of a pentamer or less oligomer, more preferably a tetramer or less oligomer, still more preferably a trimer or less oligomer, when a unit composed of one molecule of terephthalic acid and one molecule of 1,4-butanediol is defined as one monomer. When the concentration of 1,4-butanediol in the reaction system is low, the number-average degree of oligomerization tends to be increased. Since the above deactivation of the titanium compound tends to be caused under such conditions, even though it is attempted to obtain the oligomer having a desired esterification conversion, the amount of THF by-produced tends to be increased, and further the polycondensation reaction velocity in the polycondensation step following the esterification reaction step tends to be lowered.

The number-average degree of oligomerization obtained in the esterification reaction may be measured by a vapor osmometer, end group titration, or quantitative determination of end groups by NMR.

In the present invention, there is employed the process in which terephthalic acid and 1,4-butanediol are continuously subjected to esterification reaction in the presence of the titanium compound catalyst in the respective esterification reaction vessels while supplying at least a part of 1,4-butanediol to the esterification reaction vessels independently of terephthalic acid.

More specifically, in the present invention, in order to decrease the haze or impurities due to the catalyst and prevent deterioration in activity of the catalyst, 1,4-butanediol is preferably supplied to the respective esterification reaction vessels independently of terephthalic acid and separately from the 1,4-butanediol supplied together with terephthalic acid in the form of a raw slurry or solution. Hereinafter, the 1,4-butanediol supplied independently of terephthalic acid is occasionally referred to as "separately supplied 1,4-butanediol".

As the "separately supplied 1,4-butanediol", there may be used fresh 1,4-butanediol having no relation to that used in the process. Alternatively, as the "separately supplied 1,4-butanediol", there may also be used the 1,4-butanediol which is distilled off from the respective esterification reaction vessels, captured by a condenser, etc., and then circulated to the reaction vessels directly or after being temporarily stored in a storage tank, or high-purity or purified 1,4-butanediol obtained by separating and removing impurities from the above 1,4-butanediol. Hereinafter, the "separately supplied 1,4-butanediol" composed of the 1,4-butanediol captured by a condenser, etc., and circulated to the reaction vessels, is occasionally referred to as "re-circulated 1,4-butanediol". From the standpoints of effective utilization of sources and simplified facilities, the "re-circulated 1,4-butanediol" is preferably used as the "separately supplied 1,4-butanediol".

The 1,4-butanediol distilled off from the esterification reaction vessel or the transesterification reaction vessel usually contains, in addition to 1,4-butanediol, other components such as water, alcohol, THF and dihydrofuran. Therefore, the 1,4-butanediol distilled off from the reaction vessel is preferably purified to remove water, alcohol, THF, etc., therefrom after or while collecting the 1,4-butanediol by a condenser, etc., prior to circulating the 1,4-butanediol to the reaction vessel.

In the present invention, preferred is that not less than 10% by weight of the "separately supplied 1,4-butanediol" is directly returned to the liquid phase portion of the reaction solution in the respective esterification reaction vessels. Here, the liquid phase portion of the reaction solution means a portion located at a liquid phase side to a boundary face between gas and liquid in the esterification reaction vessel, and the direct return to the liquid phase portion of the reaction solution means that the "separately supplied 1,4-butanediol" is directly supplied to the liquid phase portion using a conduit, etc., without passing through the gas phase portion in the reaction vessel. The amount of the "separately supplied 1,4-butanediol" directly returned to the liquid phase portion of the reaction solution is preferably not less than 30% by weight, more preferably not less than 50% by weight, still more preferably not less than 80% by weight, most preferably not less than 90% by weight. When the amount of the "separately supplied 1,4-butanediol" directly returned to the liquid phase portion of the reaction solution is too small, the titanium compound catalyst tends to be deactivated.

Also, the temperature of the "separately supplied 1,4-butanediol" returned to the liquid phase portion of the reaction solution is usually 50 to 220° C., preferably 100 to 200° C., more preferably 150 to 190° C. When the temperature of the "separately supplied 1,4-butanediol" returned to the liquid phase portion of the reaction solution is too high, the amount of THF by-produced tends to be increased. When the temperature of the "separately supplied 1,4-butanediol" returned to the liquid phase portion of the reaction solution is too low, thermal load tends to be increased, resulting in loss of energy.

Also, in the present invention, in order to prevent deactivation of the catalyst, preferred is that not less than 10% by weight of the titanium catalyst used in the esterification reaction is directly supplied to a liquid phase portion of the reaction solution independently of the terephthalic acid. Here, the liquid phase portion of the reaction solution means a portion located at a liquid phase side to a boundary face between gas and liquid in the esterification reaction vessel. The direct supply of the catalyst to the liquid phase portion of the reaction solution means that the titanium catalyst is directly added to the liquid phase portion using a conduit, etc., without passing through the gas phase portion in the reaction vessel. The amount of the titanium catalyst directly added to the liquid phase portion of the reaction solution is preferably not less than 30% by weight, more preferably not less than 50% by weight, still more preferably not less than 80% by weight, most preferably not less than 90% by weight.

When the amount of the titanium compound catalyst directly supplied to the liquid phase portion of the reaction solution is less than 30% by weight, the deactivation of the catalyst as well as the discoloration of the resultant product tend to be caused, and the impurities tend to be produced in the gas phase portion of the respective esterification reaction vessels owing to vaporization or sublimation of the titanium compound and entrainment thereof, resulting in occurrence of various troubles.

The above titanium catalyst may be supplied to the liquid phase portion of the reaction solution in the esterification reaction vessel either directly or in the form of a solution prepared by dissolving the catalyst in a solvent, etc. In order to stabilize the amount of the catalyst supplied and prevent adverse influences such as deterioration in its quality due to heat generated from a heating medium jacket of the reaction vessel, it is preferred to use the catalyst diluted with a solvent such as 1,4-butanediol. In this case, the titanium catalyst concentration in the dilute catalyst solution is usually 0.01 to 20% by weight, preferably 0.05 to 10% by weight, more preferably 0.08 to 8% based on the total weight of the solution. Further, from the standpoint of decreasing the impurities, the water concentration in the dilute catalyst solution is usually 0.05 to 1.0% by weight, preferably 0.1 to 0.5% by weight. The dilute catalyst solution may be prepared at a temperature of usually 20 to 150° C., preferably 30 to 100° C., more preferably 40 to 80° C. in order to prevent the catalyst from being deactivated or agglomerated. Further, from the standpoint of preventing deterioration in quality, crystallization and deactivation of the catalyst and stably supplying the catalyst, the dilute catalyst solution is preferably mixed with the separately supplied 1,4-butanediol in a conduit, etc, and then supplied to the esterification reaction vessel.

In the process for production of PBT using the direct polymerization method, the early esterification reaction is usually followed by the polycondensation reaction. In the present invention, from the standpoints of good productivity, stable quality of products and improving effects attained by the present invention, there may be preferably used a so-called continuous method in which after the esterification reaction is conducted by a continuous method, the following polycondensation reaction is also conducted by a continuous method.

The polycondensation reaction of PBT may be conducted using either a single reaction vessel or a plurality of reaction vessels. The polycondensation reaction is preferably conducted using a plurality of reaction vessels. In the case where the polycondensation reaction is continuously conducted, there are preferably used 2 to 5 stage polycondensation reaction vessels which are connected in series and whose pressures are set so as to be different from each other.

The types of the polycondensation reaction vessels may be any of vertical agitation complete mixing tanks, vertical thermal convection-type mixing tanks and tower-type continuous reaction vessels, or the combination of these types of reaction vessels. In particular, the polycondensation reaction vessels are preferably those equipped with a stirrer. As the stirrer, there may be used not only ordinary stirring type apparatuses constituted from a power section, a bearing, an axis and agitation blades, but also high-speed rotation type stirring apparatuses such as turbine-stator type high-speed rotating stirrers, disk mill type stirrers and rotor mill type stirrers.

The stirring method is not particularly limited. In the present invention, there may be used not only ordinary stirring methods in which the reaction solution is directly stirred from upper portion, lower portion and side portion of the reaction vessel, but also the method of discharging a part of the reaction solution out of the reaction vessel through a conduit, etc., stirring the solution using a line mixer, etc., and then circulating the reaction solution to the reaction vessel. In particular, it is recommended to use as at least one of the polycondensation reaction vessels, such a horizontal-type reactor having a horizontal rotation axis which is excellent in surface renewal property, self-cleanability and plug flow property.

In addition, in order to prevent coloration and deterioration of the resultant product, and inhibit increase in undesirable end groups such as vinyl group, at least one of the polycondensation reaction vessels may be operated under a high vacuum condition, i.e., under a pressure of usually not more than 1.3 kPa, preferably not more than 0.5 kPa, more preferably not more than 0.3 kPa at a temperature of usually 225 to 255° C., preferably 230 to 250° C., more preferably 233 to 245° C. Also, the average residence time calculated as that of the obtained PBT is usually 0.5 to 12 hours, preferably 1 to 8 hours, more preferably 2 to 6 hours.

In addition, in the polycondensation reaction process of the PBT, after conducting the melt polycondensation to produce PBT having a relatively low molecular weight, for example, those having an intrinsic viscosity of about 0.1 to 1.0 dL/g, the PBT may be successively subjected to solid-state polycondensation (solid-state polymerization) at a temperature not higher than the melting point of the PBT.

The PBT produced by the process of the present invention is considerably reduced in content of impurities due to the catalyst. Therefore, even if removal of the impurities is not performed, the obtained PBT can exhibit an excellent quality. However, by disposing a filter in a flow path for the polymer precursor or polymer, it is possible to obtain PBT having a more excellent quality. In the present invention, for the reasons as described above, in the case where the filter having the same mesh size as that used in the conventional PBT production facilities is used, a service life thereof up to its replacement can be prolonged. Also, if the service life up to the replacement is set to the same period, it is possible to dispose a filter having a smaller mesh size.

However, when the filter is disposed on an excessively upstream side of the production process, it may be difficult to remove impurities generated on a downstream side thereof. On the contrary, when the filter is disposed on a high-viscosity downstream side of the production process, the filter tends to suffer from large pressure loss. Therefore, in order to maintain a suitable flow amount of the fluid, it is required to increase the mesh size or filtering area of the filter as well as a scale of the facilities such as conduits. In addition, since the filter undergoes a high shear force when the fluid is passed therethrough, the PBT tends to be inevitably deteriorated in quality by heat generation due to the shearing. For this reason, the filter may be selectively disposed at the position where the PBT or the precursor thereof has an intrinsic viscosity of usually 0.1 to 1.2 dL/g, preferably 0.2 to 1.0 dL/g, more preferably 0.5 to 0.9 dL/g.

As the material of the filter, there may be used any of metal winding, laminated metal mesh, metallic non-woven fabric and porous metal plate. Among these materials, laminated metal mesh and metallic non-woven fabric are preferred from the standpoint of filtration accuracy. In particular, more preferred are filters having a mesh size which is fixed by sintering treatment. The filter may have any suitable shape such as basket type, disk type, leaf disk type, tube type, flat-cylindrical type and pleated cylindrical type. Also, in order to prevent the operation of the plant from being adversely affected by disposing the filter, a plurality of filters, a switchable structure or an auto screen changer is preferably used.

The absolute filtration accuracy of the filter is not particularly limited, and is usually 0.5 to 200 µm, preferably 1 to 100 µm, more preferably 5 to 50 µm, still more preferably 10 to 30 µm. When the absolute filtration accuracy is too large, the filter may fail to exhibit the effect of decreasing impurities in the polymer product. When the absolute filtration accuracy is too small, the deterioration in productivity as well as increase in frequency of replacement of the filter tend to be caused. The absolute filtration accuracy used herein means a minimum particle size of particles which can be completely removed by filtration upon conducting a filtering test using standard size particles such as glass beads having a known uniform particle size.

Upon the polycondensation reaction, in general, the same catalyst as added upon the previous esterification reaction may be successively used as the polycondensation reaction catalyst. Alternatively, upon completion of the esterification reaction or upon the polycondensation reaction, a fresh catalyst or co-catalyst may be added. The kind of freshly added catalyst or co-catalyst may be either the same as or different from that used in the previous esterification reaction.

The amount of the catalyst or co-catalyst added is not particularly limited. However, when the amount of the catalyst or co-catalyst added is too large, the resultant PBT product tends to be deteriorated in color tone and heat stability, and increased in end carboxyl group concentration. Therefore, the concentration of metal atom based on the obtained PBT is preferably controlled to not more than 100 ppm, more preferably not more than 50 ppm, still more preferably not more than 20 ppm.

The PBT produced by the process of the present invention has an intrinsic viscosity of usually 0.60 to 2.00 dL/g, preferably 0.65 to 1.50 dL/g, more preferably 0.68 to 1.30 dL/g. When the intrinsic viscosity of the PBT is less than 0.60 dL/g, the molded product obtained from the PBT tends to be insufficient in mechanical strength. When the intrinsic viscosity of the PBT is more than 2.00 dL/g, the PBT tends to have a too high melt viscosity and, therefore, tends to be deteriorated in fluidity and moldability. The above intrinsic viscosity is the value measured at 30° C. using a mixed solvent containing phenol and tetrachloroethane at a weight ratio of 1:1.

The end carboxyl group concentration in the PBT produced by the process of the present invention is usually in the range of 0.1 to 50 µeq/g, preferably 1 to 40 µeq/g, more preferably 1 to 30 µeq/g, still more preferably 1 to 25 µeq/g. When the end carboxyl group concentration is too high, the resultant PBT tends to be deteriorated in hydrolysis resistance.

The crystallization temperature of the PBT produced by the process of the present invention is usually in the range of 170 to 190° C., preferably 172 to 185° C., more preferably 175 to 180° C. The crystallization temperature used herein means an exothermic peak temperature due to crystallization, which is observed when a molten resin is cooled at a temperature drop rate of 20° C./min using a differential scanning calorimeter. The crystallization temperature is substantially in proportion to a crystallization velocity of the PBT. Namely, the higher the crystallization temperature, the higher the crystallization velocity. Therefore, when the crystallization temperature becomes higher, it is possible to shorten a time for cooling upon injection molding, resulting in enhanced productivity. On the other hand, when the crystallization temperature is low, a long period of time is required to crystallize the PBT upon injection molding, so that it is inevitably necessary to prolong the cooling time after the injection molding, resulting in prolonged molding cycle time and, therefore, poor productivity.

The solution haze of the PBT produced by the process of the present invention, which is determined by measuring a haze of a solution prepared by dissolving 2.7 g of the PBT in 20 mL of a mixed solvent containing phenol and tetrachloroethane at a weight ratio of 3:2, is usually not more than 3%, preferably not more than 2%, more preferably not more than 1%, still more preferably not more than 0.5%. The solution haze may vary depending upon the amount of the titanium compound catalyst deactivated, and tends to be increased when the degree of deactivation of the titanium compound catalyst is larger. When the solution haze is more than 3%, the PBT circulated through the process tends to be deposited at portions having a poor fluidity in the process, etc., after being operated for a long period of time, and agglomerated and finally grown into impurities. The resultant impurities cause fisheyes upon the production of films, sheet, etc., and a thread breakage upon the production of filaments or fibers.

Figure 2:
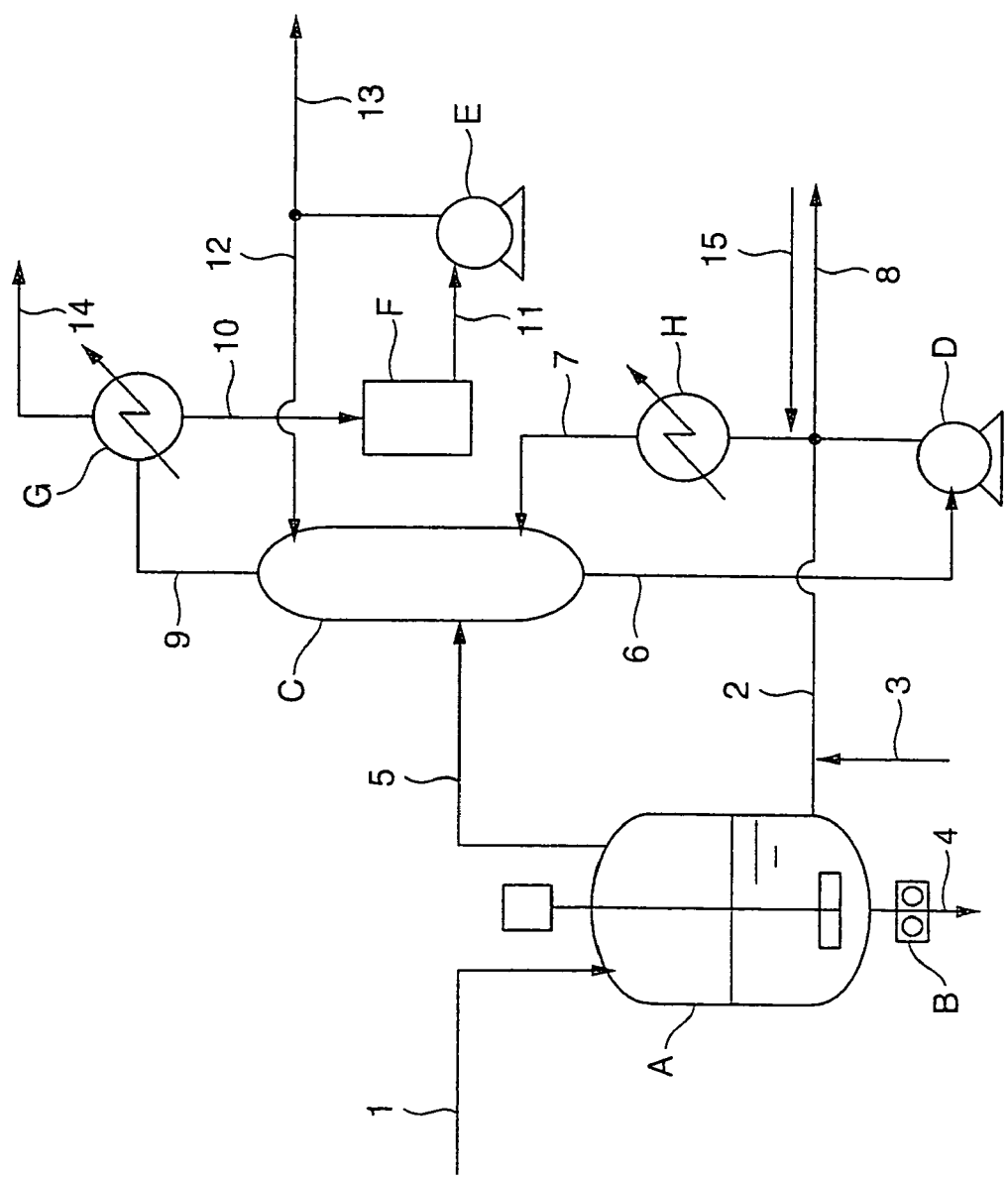
FIG. 2 is an explanatory view showing another example of an esterification reaction process used in the present invention.
Figure 3:
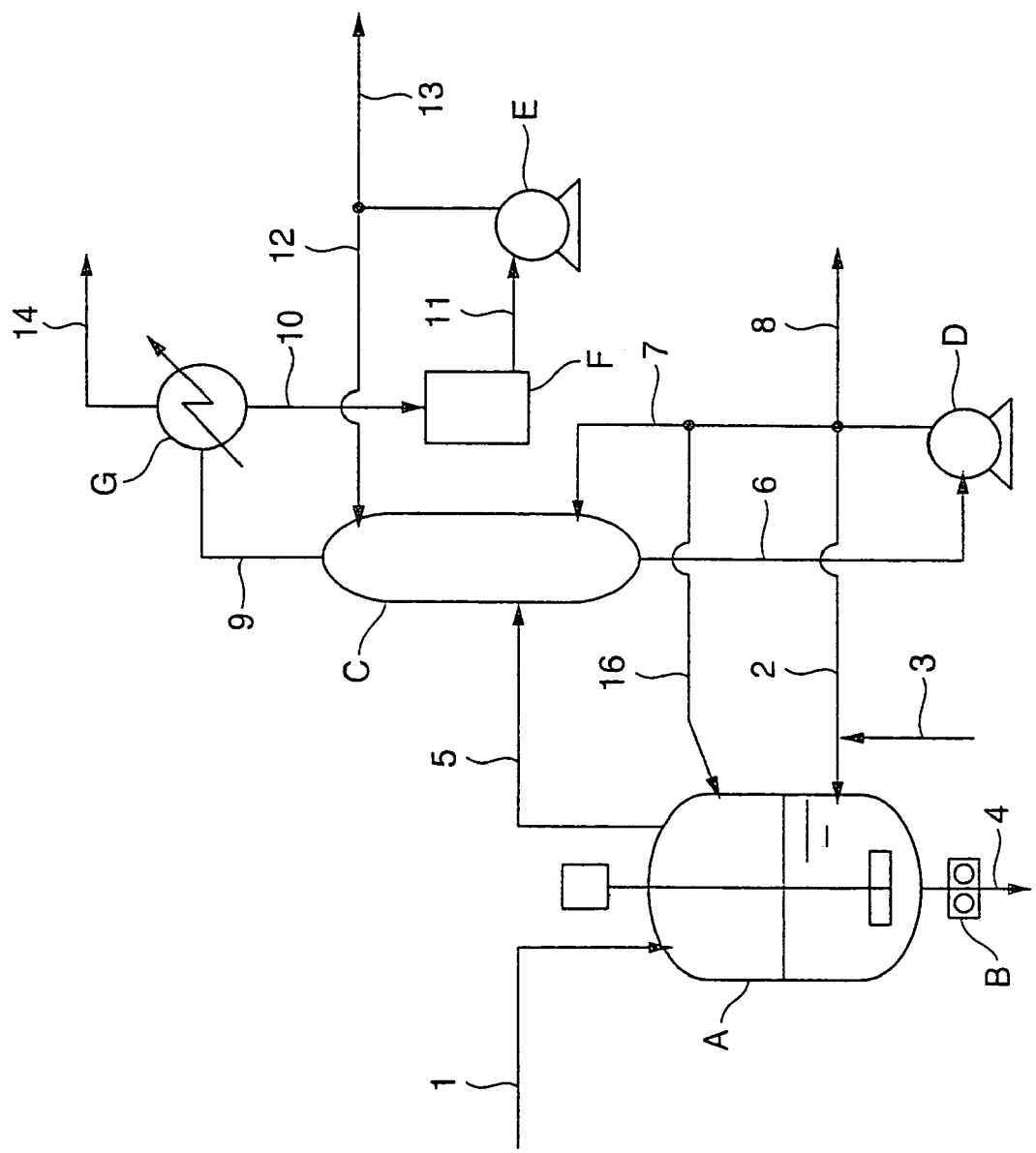
FIG. 3 is an explanatory view showing an other example of an esterification reaction process used in the present invention.
Figure 4:
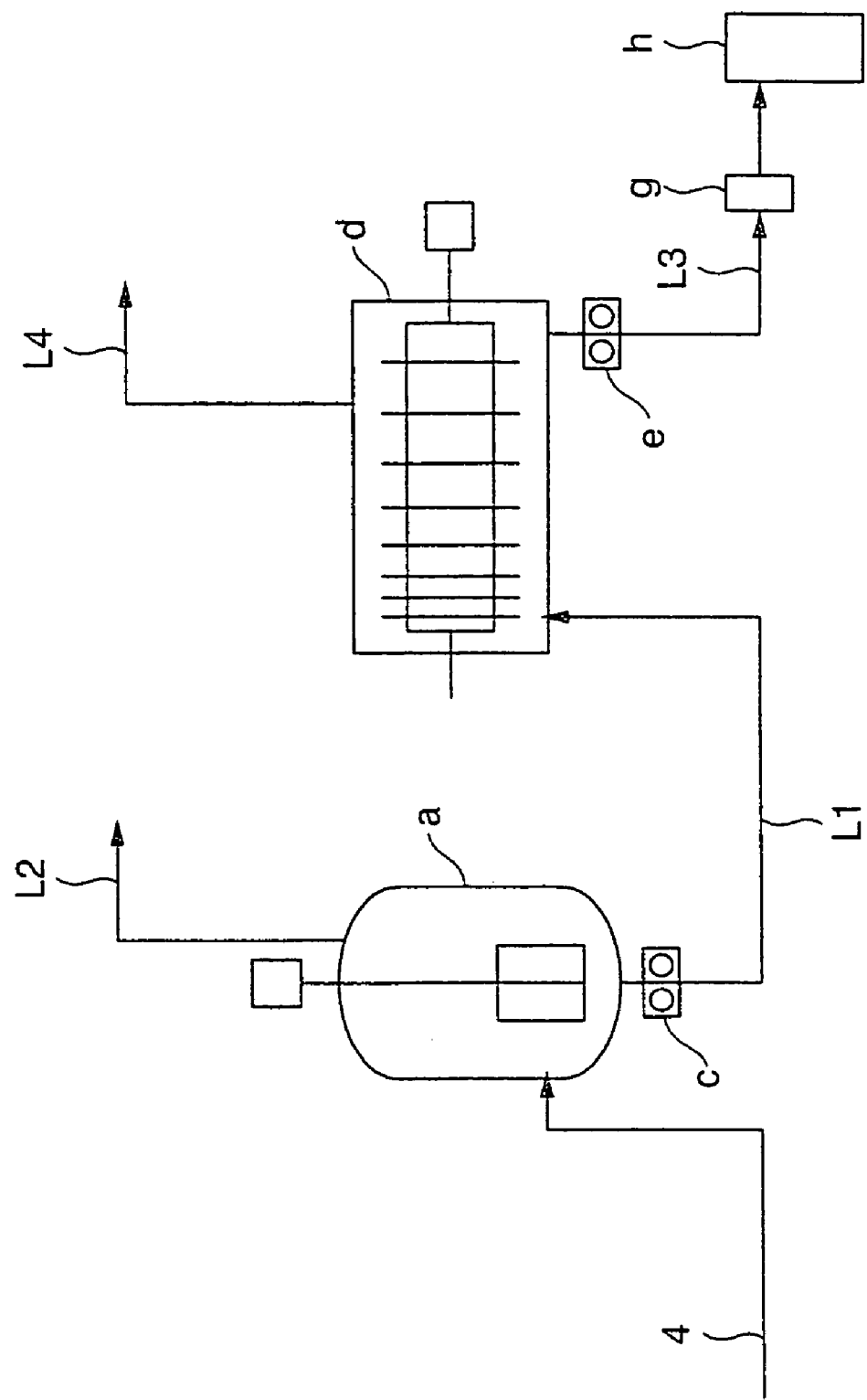
FIG. 4 is an exemplary view showing an example of a polycondensation process used in the present invention.
Figure 5:
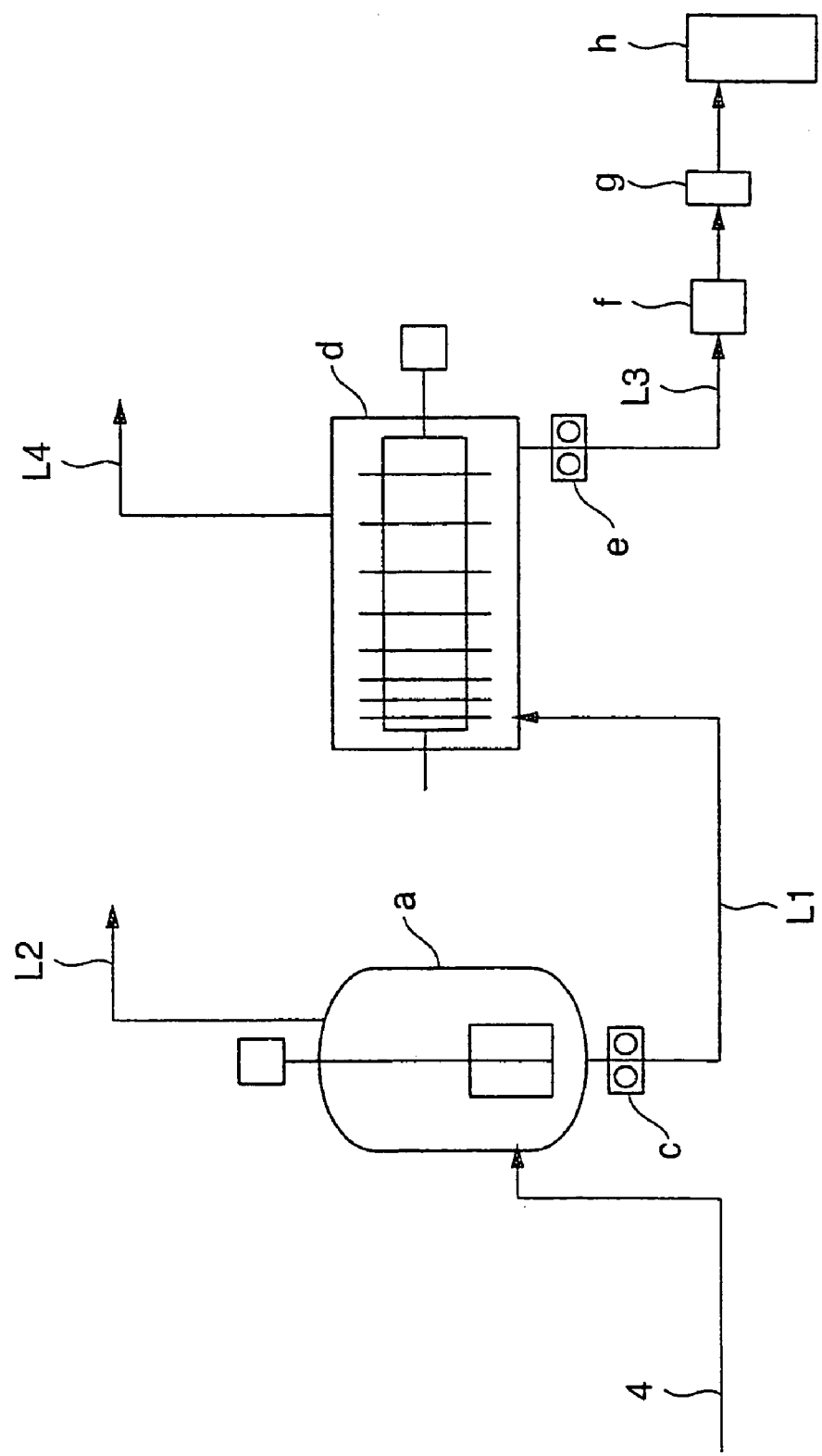
FIG. 5 is an exemplary view showing another example of a polycondensation process used in the present invention.
Figure 6:
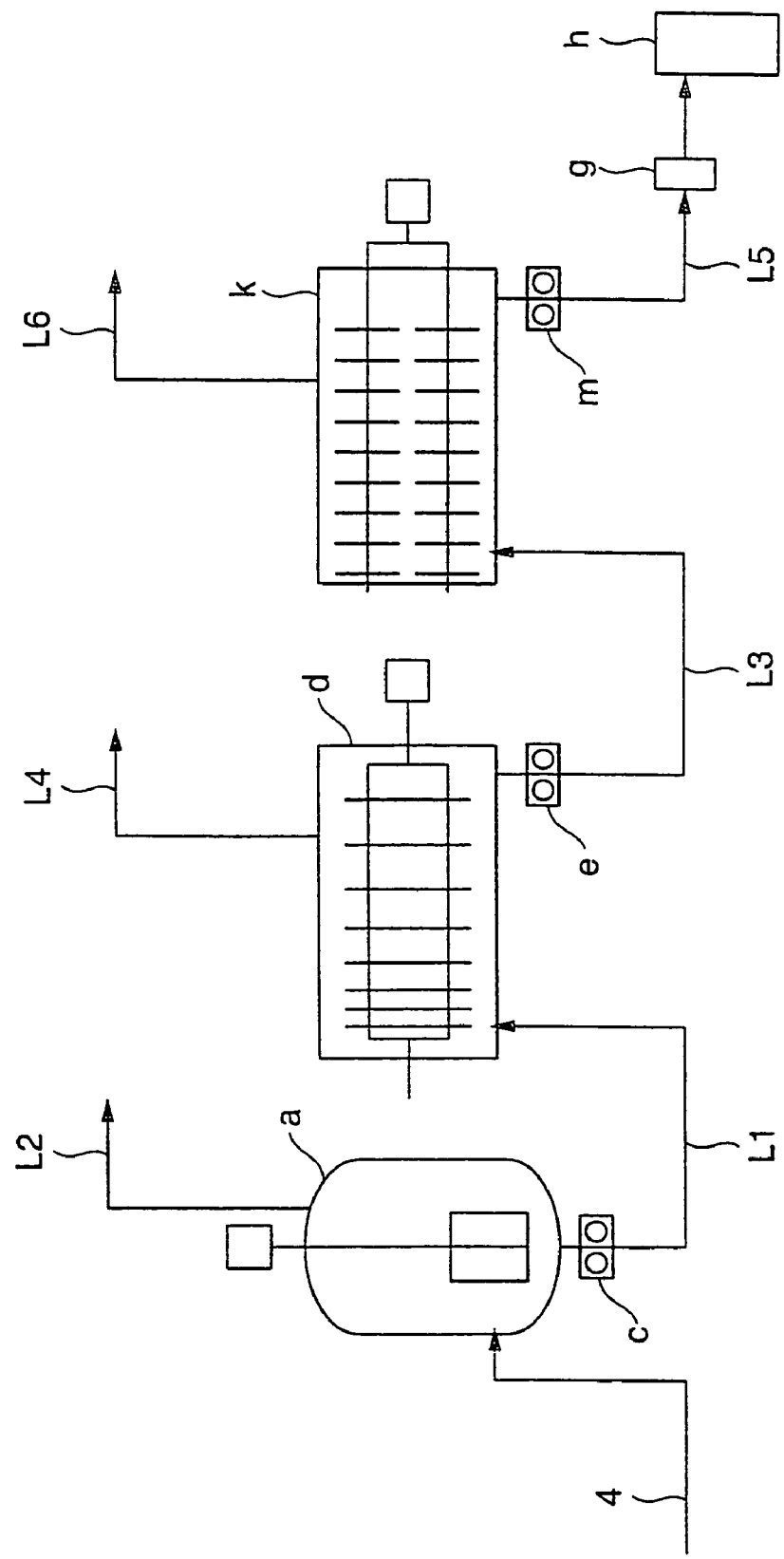
FIG. 6 is an exemplary view showing an other example of a polycondensation process used in the present invention.
Figure 7:
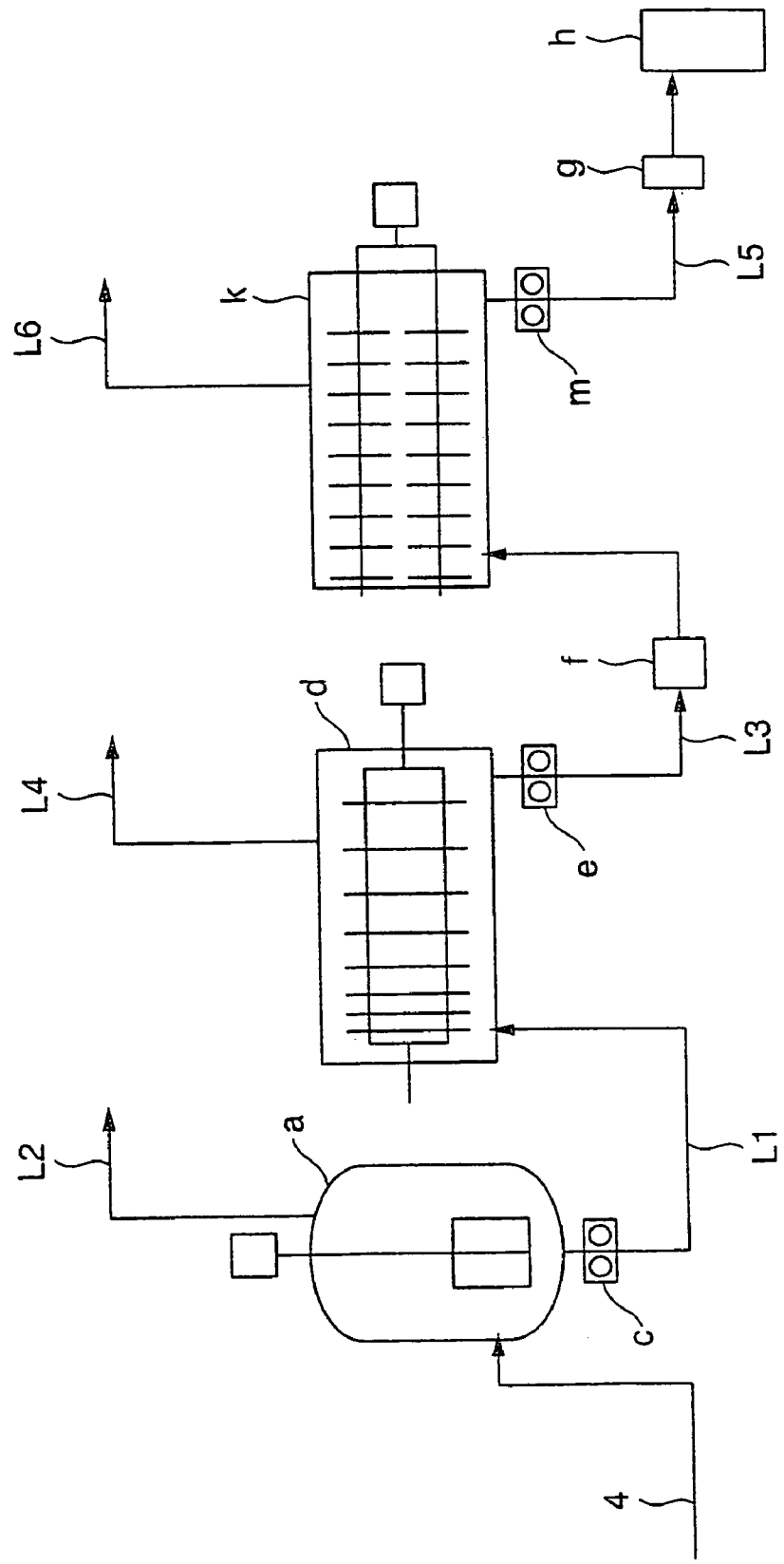
FIG. 7 is at exemplary view showing an other example of a polycondensation process used in the present invention.

Next, the process for producing the PBT according to the preferred embodiment of the present invention is described below by referring to the accompanying drawings. FIG. 1 is an explanatory view showing an example of an esterification reaction process used in the present invention. FIGS. 2 and 3 are explanatory views showing other examples of an esterification reaction process used in the present invention. FIG. 4 is an exemplary view showing an example of a polycondensation process used in the present invention. FIGS. 5 to 7 are exemplary views showing other examples of a polycondensation process used in the present invention.

Referring to FIG. 1, raw terephthalic acid is usually mixed with 1,4-butanediol in a raw material mixing tank (not shown), and the resultant slurry is supplied through a raw material feed line (1) to a reaction vessel (A). On the other hand, a catalyst is preferably dissolved in 1,4-butanediol in a catalyst preparation tank (not shown) to prepare a catalyst solution, and then supplied through a catalyst feed line (3). In FIG. 1, there is shown such an embodiment in which a recirculation line (2) for feeding the recirculated 1,4-butanediol is connected to the catalyst feed line (3) to mix the recirculated 1,4-butanediol and the catalyst with each other, and then the resultant mixture is supplied to a liquid phase portion in the reaction vessel (A).

Gases distilled off from the reaction vessel (A) are delivered through a distillate line (5) to a rectifying column (C) where the gases are separated into a high-boiling component and a low-boiling component. Usually, the high-boiling component is composed mainly of 1,4-butanediol, and the low-boiling component is composed mainly of water and THF.

The high-boiling component separated at the rectifying column (C) is discharged through a discharge line (6), and by a pump (D), a part thereof is circulated through the recirculation line (2) to the reaction vessel (A), and another part thereof is returned through a circulation line (7) to the rectifying column (C). Further, an excess of the high-boiling component is discharged outside through a discharge line (8). Meanwhile, in the case where it is necessary to supply additional 1,4-butanediol to the reaction vessel (A), 1,4-butanediol is supply through an additional supplying or a recovery line (15). On the other hand, the low-boiling component separated at the rectifying column (C) is discharged through a gas discharge line (9), condensed in a condenser (G), and then delivered through a condensate line (10) to a tank (F) in which the condensed low-boiling component is temporarily stored. A part of the low-boiling component collected in the tank (F) is returned to the rectifying column (C) through a discharge line (11), a pump (E) and a circulation line (12), whereas the remaining part of the low-boiling component is discharged outside through a discharge line (13). The condenser (G) is connected to an exhaust apparatus (not shown) through a vent line (14). An oligomer produced in the reaction vessel (A) is discharged therefrom through a discharge pump (B) and a discharge line (4).

In the process shown in FIG. 1, although the catalyst feed line (3) is connected to the recirculation line (2), these lines may be disposed independently of each other. Also, the raw material feed line (1) may be connected to the liquid phase portion in the reaction vessel (A).

The process shown in FIG. 2 is different from the process shown in FIG. 1 in that a reboiler (H) is equipped to the rectifying column (C). The provision of the reboiler (H) facilitates control of operation of the rectifying column (C).

The process shown in FIG. 3 is different from the process shown in FIG. 1 in that a bypass line (16) branched from the circulation line (7) is connected to a gas phase portion in the reaction vessel (A). Therefore, in the process shown in FIG. 3, a part of the recirculated 1,4-butanediol is returned to the reaction solution through the gas phase portion in the reaction vessel (A).

In the process shown in FIG. 4, the oligomer supplied through the discharge line (4) as shown in FIGS. 1 to 3, is polycondensed under reduced pressure in a first polycondensation reaction vessel (a) to produce a prepolymer, and then supplied through a discharging gear pump (c) and a discharge line (L1) to a second polycondensation reaction vessel (d). In the second polycondensation reaction vessel (d), the polycondensation is further conducted usually under a pressure lower than that in the first polycondensation reaction vessel (a) for converting the prepolymer into a polymer. The thus obtained polymer is delivered through a discharging gear pump (e) and a discharge line (L3) to a die head (g) from which the polymer is extruded into molten strands. The strands are cooled with water, etc., and then cut into pellets using a rotary cutter (h). Reference numeral (L2) represents a vent line extending from the first polycondensation reaction vessel (a), and reference numeral (L4) represents a vent line extending from the second polycondensation reaction vessel (d).

The process shown in FIG. 5 is different from the process shown in FIG. 4 in that a filter (f) is disposed on a flow path of the discharge line (L3).

The process shown in FIG. 6 is different from the process shown in FIG. 4 in that a third polycondensation reaction vessel (k) is further disposed subsequent to the second polycondensation reaction vessel (d). The third polycondensation reaction vessel (k) is constituted from a plurality of agitation blade blocks, more specifically, is a horizontal type reaction vessel equipped with twin-axis self-cleaning agitation blades. The polymer introduced from the second polycondensation reaction vessel (d) to the third polycondensation reaction vessel (k) through the discharge line (L3) is further subjected to polycondensation reaction, and then delivered through a discharging gear pump (m) and a discharge line (L5) to the die head (g) from which the polymer is extruded into molten strands. The obtained strands are cooled with water, etc., and then cut into pellets using the rotary cutter (h). Reference numeral (L6) represents a vent line extending from the third polycondensation reaction vessel (k).

The process shown in FIG. 7 is different from the process shown in FIG. 6 in that the filter (f) is disposed in the course of the discharge line (L3) connected between the second polycondensation reaction vessel (d) and the third polycondensation reaction vessel (k).

The PBT of the present invention may further contain oxidation inhibitors including phenol compounds such as 2,6-di-t-butyl-4-octyl phenol and pentaerithrityl-tetrakis[3-(3',5'-t-butyl-4'-hydroxyphenyl)propionate], thioether compounds such as dilauryl-3,3'-thiodipropionate and pentaerithrityl-tetrakis (3-laurylthiodipropionate), and phosphorus compounds such as triphenyl phosphite, tris(nonylphenyl) phosphite and tris(2,4-di-t-butylphenyl)phosphite; mold release agents including paraffin waxes, microcrystalline waxes, polyethylene waxes, long-chain fatty acids and esters thereof such as typically montanic acid and montanic acid esters, and silicone oils; or the like.

The PBT of the present invention may be blended with reinforcing fillers. The reinforcing fillers are not particularly restricted, and examples thereof may include inorganic fibers such as glass fibers, carbon fibers, silica/alumina fibers, zirconia fibers, boron fibers, boron nitride fibers, silicon nitride/potassium titanate fibers and metal fibers; organic fibers such as aromatic polyamide fibers and fluorouracil fibers; or the like. These reinforcing fillers may be used in the combination of any two or more thereof. Of these reinforcing fillers, preferred are inorganic fillers, and more preferred are glass fibers.

In the case where the reinforcing fillers are composed of inorganic or organic fibers, an average fiber diameter thereof is not particularly restricted, and is usually in the range of 1 to 100 μm, preferably 2 to 50 μm, more preferably 3 to 30 μm, still more preferably 5 to 20 μm, and an average fiber length thereof is also not particularly restricted, and is usually in the range of 0.1 to 20 mm, preferably 1 to 10 mm.

The reinforcing fillers are preferably surface-treated with a sizing agent or a surface-treating agent in order to enhance an interfacial adhesion between the reinforcing fillers and the PBT. Examples of the sizing agent and surface-treating agent may include functional compounds such as epoxy-based compounds, acrylic-based compounds, isocyanate-based compounds, silane-based compounds and titanate-based compounds. The reinforcing fillers may be previously surface-treated with the sizing agent or surface-treating agent, or may be surface-treated therewith by adding the sizing agent or surface-treating agent upon production of the PBT composition. The amount of the reinforcing fillers added is usually not more than 150 parts by weight, preferably 5 to 100 parts by weight based on 100 parts by weight of the PBT resin.

The PBT of the present invention may be blended with other fillers together with the reinforcing fillers. Examples of the other fillers blended in the PBT may include plate-shaped inorganic fillers, ceramic beads, asbestos, wollastonite, talc, clay, mica, zeolite, kaolin, potassium titanate, barium sulfate, titanium oxide, silicon oxide, aluminum oxide, magnesium hydroxide, etc. When the plate-shaped inorganic fillers are blended in the PBT, the molded product obtained from the PBT can be prevented from undergoing anisotropy and warping. Specific examples of the plate-shaped inorganic fillers may include glass flakes, mica, metal foils, etc. Of these inorganic fillers, preferred are glass flakes.

The PBT of the present invention may also contain a flame retardant in order to impart a flame retardancy thereto. The flame retardant usable herein is not particularly restricted, and examples thereof may include organohalogen compounds, antimony compounds, phosphorus compounds, or other organic and inorganic flame retardants. Specific examples of the organohalogen compounds may include brominated polycarbonates, brominated epoxy resins, brominated phenoxy resins, brominated polyphenylene ether resins, brominated polystyrene resins, brominated bisphenol A, polypentabromobenzyl acrylate or the like. Specific examples of the antimony compounds may include antimony trioxide, antimony pentaoxide, sodium antimonate or the like. Specific examples of the phosphorus compounds may include phosphoric esters, polyphosphoric acid, ammonium polyphosphate, red phosphorus or the like. Specific examples of the other organic flame retardants may include nitrogen compounds such as melamine and cyanuric acid, or the like. Specific examples of the other inorganic flame retardants may include aluminum hydroxide, magnesium hydroxide, silicon compounds, boron compounds or the like.

In addition, the PBT of the present invention may further contain, if required, various ordinary additives. The additives are not particularly restricted, and examples thereof may include, in addition to stabilizers such as antioxidants and heat stabilizers, lubricants, mold release agents, catalyst deactivators, nucleating agent, crystallization accelerators or the like. These additives may be added during or after the polymerization reaction. The PBT may be further blended with stabilizers such as ultraviolet absorbers and weatherproof agents, colorants such as dyes and pigments, antistatic agents, foaming agents, plasticizers, impact modifiers, etc., in order to impart desired properties thereto.

Further, the PBT of the present invention may be blended, if required, with thermoplastic resins such as polyethylene, polypropylene, polystyrene, polyacrylonitrile, polymethacrylic esters, ABS resins, polycarbonates, polyamides, polyphenylene sulfides, polyethylene terephthalate, liquid crystal polyesters, polyacetal and polyphenylene oxide; and thermosetting resins such as phenol resins, melamine resins, silicone resins and epoxy resins. These thermoplastic and thermosetting resins may be used in the combination of any two or more thereof.

The method of blending the above various additives and resins in the PBT is not particularly restricted. In the present invention, there may be preferably used the blending method using a single- or twin-screw extruder or kneader equipped with a vent port for removal of volatile components. The respective components together with the additional optional components can be supplied to the kneader either simultaneously or sequentially. Also, two or more components selected from the respective components and the additional optional components may be previously mixed together.

The method for molding the PBT is not particularly restricted, and any molding methods generally used for molding thermoplastic resins may be usable in the present invention. Examples of the molding methods may include injection-molding method, blow-molding method, extrusion-molding method, press-molding method or the like.

The PBT produced by the process of the present invention is excellent in color tone, heat stability, transparency and quality stability, and has a less content of impurities. Therefore, the PBT of the present invention can exhibit remarkable improving effects when used in the applications such as injection-molded products such as electric and electronic parts and automobile parts, as well as films, monofilaments, fibers or the like.

EXAMPLES

The present invention is described in more detail below by Examples, but the Examples are only illustrative and not intended to limit the scope of the present invention.

Meanwhile, the properties and evaluation items used in the following Examples and Comparative Examples were measured by the following methods.

(1) Esterification Conversion:

The acid value and the saponification value were calculated according to the following formula (IV). The acid value was determined by subjecting a solution prepared by dissolving the oligomer in N,N-dimethylformamide to titration using a 0.1N KOH/methanol solution. In addition, the saponification value was determined by hydrolyzing the oligomer with a 0.5N KOH/ethanol solution and then subjecting the hydrolyzed reaction solution to titration using 0.5N hydrochloric acid.

Esterification conversion=[(Saponification Value)−(Acid Value)]/(Saponification Value)×100 (IV)

(2) Number-Average Polymerization Degree of Oligomer:

About 20 mg of the oligomer was dissolved in 1 mL of a mixed solvent containing heavy chloroform and hexafluoroisopropanol at a volume ratio of 7:3, and the resultant solution was subjected to $^1$H-NMR spectrum measurement at room temperature using a spectrometer "Unity Plus 400" manufactured by Varian Co., Ltd. The number-average degree of oligomerization was determined by a ratio of the signal attributed to β-methylene of 1,4-butanediol unit which appears at 1.6 to 2.2 ppm in the $^1$H-NMR spectrum (from which the amount of a signal attributed to unreacted 1,4-butanediol which was obtained by quantitative determination of the signal of α-methylene appearing at 3.7 ppm is subtracted) to the signal attributed to terephthalic acid unit appearing at 8 ppm therein.

(3) Amount of THF By-Produced:

The amount of THF by-produced was determined by conducting a quantitative determination thereof by gas chromatography, and dividing the amount (mol) of THF produced per unit time by the amount (mol) of terephthalic acid supplied per unit time. The lower the value, the lower the amount of THF by-produced.

(4) Calculation of β:

The β value was calculated from BM/TM, catalyst concentration and pressure according to the formula (I).

(5) Intrinsic Viscosity (IV):

The intrinsic viscosity was measured using an Ubbelohde viscometer as follows. That is, using a mixed solvent containing phenol and tetrachloroethane at a weight ratio of 1:1, the drop times (s) in a 1.0 g/dL polymer solution and the solvent only were respectively measured at a temperature of 30° C., and the intrinsic viscosity was calculated from the following formula (V):

$$IV=[(1+4K_H\eta_{sp})^{0.5}-1]/2K_H C \qquad (V)$$

wherein $\eta_{sp}=\eta/\eta_0-1$; $\eta$ is a drop time (s) in the polymer solution; $\eta_0$ is a drop time (s) in the solvent only; C is a concentration (g/dL) of the polymer solution; and $K_H$ is a Huggins constant (0.33 was used as the value of $K_H$).

(6) End Carboxyl Group Concentration:

A solution prepared by dissolving 0.5 g of PBT or an oligomer thereof in 25 mL of benzyl alcohol was titrated with a benzyl alcohol solution containing 0.01 mol/L of sodium hydroxide.

(7) Titanium Concentration in PBT:

PBT was wet-decomposed with high-purity sulfuric acid and nitric acid for electronic industries, and measured using a high-resolution ICP (inductively coupled plasma)-MS (mass spectrometer) manufactured by Thermo-Quest Corp.

(8) End Vinyl Group Concentration:

About 100 mg of PBT was dissolved in 1 mL of a mixed solvent containing heavy chloroform and hexafluoroisopropanol at a volume ratio of 7:3, and the resultant solution was mixed with 36 μL of heavy pyridine and subjected to $^1$H-NMR measurement at 50° C. The $^1$H-NMR measurement was performed using "α-400" or "AL-400" manufactured by Nippon Denshi Co., Ltd.

(9) Solution Haze:

2.70 g of PBT was dissolved in 20 mL of a mixed solvent containing phenol and tetrachloroethane at a weight ratio of 3:2 at 110° C. for 30 min, and then cooled in a constant-temperature water vessel at 30° C. for 15 min. The haze of the solution was measured a turbidity meter "NDH-300A" with a cell length of 10 mm manufacture by Nippon Denshoku Co., Ltd. The lower the haze value, the more excellent the transparency.

(10) Color Tone of Pellets:

Using a color difference meter "Z-300A Model" manufactured by Nippon Denshoku Co., Ltd., the b value of the pellets in a L,a,b color specification system was measured, and the color tone of the pellets was evaluated by the thus measured b value. The lower the b value, the less the yellowness and the more excellent the color tone.

(11) Number of Fisheyes:

PBT pellets were dried under a nitrogen atmosphere at 120° C. for 8 hr, and then molded into a 50 μm-thick film using a film-molding machine "Model ME-20/26V2" manufactured by Optical Control Systems Inc. At this time, the temperatures of a cylinder and a die of the molding machine were respectively set to 250° C. The resultant film was tested using a film quality testing system "Type FS-5" manufactured by Optical Control Systems Inc., to count the number of fisheyes having a size of more than 200 μm per 1 m² of the film.

The results are classified into three ranks shown in Table 1 below.

TABLE 1

| Rank | Number of fisheyes |
|------|-------------------|
| A | <20 |
| B | 20 to 100 |
| C | >100 |

Example 1

PBT was produced through the esterification process shown in FIG. 1 and the polycondensation process shown in FIG. 4 by the following procedure. First, terephthalic acid was mixed with 1,4-butanediol at 60° C. at a molar ratio of 1.00:1.80 in a slurry preparation tank. The thus obtained slurry was continuously supplied at a feed rate of 41 kg/h from the slurry preparation tank through a raw material feed line (1) to an esterification reaction vessel (A) equipped with a screw-type stirrer which was previously filled with PBT oligomer having an esterification conversion of 99%. Simultaneously, 1,4-butanediol having not less than 98% by weight in purity was supplied at a feed rate of 17.2 kg/h through a recirculation line (2) to the reaction vessel (A), and further a 3.0 wt % 1,4-butanediol solution of tetrabutyl titanate as a catalyst at 65° C. was supplied through a catalyst feed line (3) to the reaction vessel (A) at a feed rate of 194 g/h (30 ppm based on theoretical yield of polymer). The water content in the catalyst solution was 0.20% by weight.

While maintaining an inside temperature and pressure of the reaction vessel (A) at 228° C. and 65 kPa, respectively, water and THF as by-produced as well as an excess amount of 1,4-butanediol were distilled off through a distillate line (5) and delivered to the rectifying column (C) where these distillates were separated into a high-boiling component and a low-boiling component. After the system was stabilized, it was confirmed that the high-boiling component which was removed from the bottom thereof, contained 1,4-butanediol in an amount of not less than 98% by weight. The amount of 1,4-butanediol supplied through a discharge line (8) and an additional supplying line (15) was controlled so as to keep a liquid level in the rectifying column (C) constant. On the other hand, the low-boiling component was removed in a gaseous state from a top of the rectifying column (C), and condensed in a condenser (G). The thus recovered low-boiling component was discharged outside through a discharge line (13) so as to keep a liquid level in a tank (F) constant. The distillate contained water and THF as main components, and was subjected to gas chromatography to measure the THF content therein and determine the amount of THF distilled off per unit time.

A predetermined amount of the oligomer produced in the reaction vessel (A) was withdrawn therefrom through the discharge line (4) by means of the pump (B). After stabilizing the reaction system, the residence time of the oligomer was controlled such that the esterification conversion thereof was in the range of 96.5 to 97.0%. At this time, it was confirmed that the average residence time in the reaction vessel (A) was 3.3 hours. The number-average polymerization degree of the obtained oligomer was 2.9. The oligomer withdrawn through the discharge line (4) was continuously supplied to a first polycondensation reaction vessel (a).

The liquid level in the first polycondensation reaction vessel (a) was controlled such that the inside temperature, pressure and residence time were 241° C., 2.1 kPa and 120 min, respectively. While discharging water, THF and 1,4-butanediol from the first polycondensation reaction vessel (a) through a vent line (L2) connected to a pressure-reducing device (not shown), the initial polycondensation reaction was conducted. The obtained reaction solution was continuously supplied to a second polycondensation reaction vessel (d).

The liquid level in the second polycondensation reaction vessel (d) was controlled such that the inside temperature, pressure and residence time were 243° C., 130 Pa and 80 min, respectively. While discharging water, THF and 1,4-butanediol from the second polycondensation reaction vessel (d) through a vent line (L4) connected to a pressure-reducing device (not shown), the polycondensation reaction was further conducted. The thus obtained polymer was continuously extruded through a die head (g) to form strands. Then, the obtained strands were cut by a rotary cutter (h). As a result, it was confirmed that the amount of THF by-produced was small, and the resultant PBT had an IV of 0.80 dL/g and an end carboxyl group concentration of 12 μeq/g, and exhibited excellent color tone and transparency as well as a less number of fisheyes. The analyzed values of the obtained PBT are shown together in Table 2.

Example 2

The same procedure as defined in Example 1 was conducted except that the catalyst solution was supplied at a feed rate of 260 g/hr, and the inside temperature, pressure and residence time of the second polycondensation reaction vessel (d) were changed to 242° C., 140 kPa and 60 min, respectively. As a result, it was confirmed that the amount of THF by-produced was small, and the obtained PBT exhibited excellent color tone and transparency as well as a less number of fisheyes. The analyzed values of the obtained PBT are shown together in Table 2.

Example 3

The same procedure as defined in Example 1 was conducted except that the catalyst solution was supplied at a feed rate of 520 g/hr; 1,4-butanediol through the recirculation line (2) were supplied at a feed rate of 30.0 kg/hr; and the inside temperature, pressure and residence time of the second polycondensation reaction vessel (d) were changed to 241° C., 180 kPa and 60 min, respectively. As a result, it was confirmed that the amount of THF by-produced was small, and the obtained PBT exhibited excellent color tone and transparency as well as a less number of fisheyes. The analyzed values of the obtained PBT are shown together in Table 2.

Example 4

The same procedure as defined in Example 2 was conducted except that the esterification reaction pressure was changed to 88 kPa. As a result, it was confirmed that the amount of THF by-produced was small, and the obtained PBT exhibited excellent color tone and transparency as well as a less number of fisheyes. The analyzed values of the obtained PBT are shown together in Table 2.

Comparative Example 1

The same procedure as defined in Example 3 was conducted except that the bottom components through the recirculation line (2) were supplied at a feed rate of 17.2 kg/hr and the inside temperature of the second polycondensation reaction vessel (d) was changed to 246° C. As a result, it was confirmed that the obtained polymer was deteriorated in color tone and solution haze, and increased in number of fisheyes. The analyzed values of the obtained polymer are shown together in Table 3.

Comparative Example 2

The same procedure as defined in Example 3 was conducted except that the catalyst solution was supplied at a feed rate of 650 g/hr, and the inside temperature and pressure of the second polycondensation reaction vessel (d) were changed to 244° C. and 170 kPa, respectively. As a result, it was confirmed that the obtained polymer was deteriorated in color tone and solution haze, and increased in number of fisheyes. The analyzed values of the obtained polymer are shown together in Table 3.

Comparative Example 3

The same procedure as defined in Example 2 was conducted except that the esterification reaction pressure was set to 15 kPa, and the inside temperature, pressure and residence time of the second polycondensation reaction vessel (d) were changed to 250° C., 130 kPa and 90 min, respectively. As a result, it was confirmed that the obtained polymer was deteriorated in color tone and solution haze, and increased in number of fisheyes. The analyzed values of the obtained polymer are shown together in Table 3.

Comparative Example 4

The same procedure as defined in Example 2 was conducted except that the amount of 1,4-butanediol fed through the recirculation line (2) was controlled to 43 kg/hr. As a result, it was confirmed that the amount of THF by-produced was large, and the obtained polymer was deteriorated in color tone.

TABLE 2

| Items | Examples | | | |
| --- | --- | --- | --- | --- |
|  | 1 | 2 | 3 | 4 |
| Esterification conditions 1,4-butanediol supplied to esterification reaction vessel | | | | |
| via raw material supplying line (1) (mol/mol-TPA) | 1.80 | 1.80 | 1.80 | 1.80 |
| via catalyst line (3) (mol/mol-TPA) | 0.02 | 0.02 | 0.04 | 0.02 |
| via recirculation line (2) (mol/mol-TPA) | 1.53 | 1.53 | 2.67 | 1.53 |
| Total amount (BM/TM) (mol/mol-TPA) | 3.34 | 3.35 | 4.51 | 3.35 |
| Ti content (ppm) | 30 | 40 | 80 | 40 |
| Pressure (kPa) | 65 | 65 | 65 | 88 |
| Residence time (hr) | 3.3 | 2.9 | 2.6 | 2.9 |
| Reaction temperature (° C.) | 228 | 228 | 228 | 228 |
| β | 5.4 | 5.1 | 5.0 | 6.1 |
| Number-average polymerization degree | 2.9 | 2.9 | 2.5 | 2.6 |
| Amount of THF by-produced (mol/mol-TPA) | 0.36 | 0.25 | 0.29 | 0.55 |

TABLE 2-continued

| | Examples | | | |
|---|---|---|---|---|
| Items | 1 | 2 | 3 | 4 |
| Properties of PBT | | | | |
| IV (dL/g) | 0.80 | 0.80 | 0.80 | 0.80 |
| End carboxyl group concentration (μeq/g) | 12 | 14 | 15 | 14 |
| End vinyl group concentration (μeq/g) | 5 | 5 | 5 | 5 |
| Solution haze (%) | <0.3 | <0.3 | <0.3 | <0.3 |
| b value of pellets | −2.0 | −1.8 | −1.3 | −1.6 |
| Number of fisheyes | A | A | A | A |

TABLE 3

| | Comparative Examples | | | |
|---|---|---|---|---|
| Items | 1 | 2 | 3 | 4 |
| Esterification conditions 1,4-butanediol supplied to esterification reaction vessel | | | | |
| via raw material supplying line (1) (mol/mol-TPA) | 1.80 | 1.80 | 1.80 | 1.80 |
| via catalyst line (3) (mol/mol-TPA) | 0.04 | 0.06 | 0.02 | 0.02 |
| via recirculation line (2) (mol/mol-TPA) | 1.53 | 2.67 | 1.53 | 3.83 |
| Total amount (BM/TM) (mol/mol-TPA) | 3.37 | 4.52 | 3.35 | 5.65 |
| Ti content (ppm) | 80 | 100 | 40 | 40 |
| Pressure (kPa) | 65 | 65 | 15 | 65 |
| Residence time (hr) | 3.0 | 2.8 | 5.0 | 2.5 |
| Reaction temperature (° C.) | 228 | 228 | 228 | 228 |
| β | 3.9 | 4.5 | 2.8 | 7.4 |
| Number-average polymerization degree | 2.8 | 2.5 | 4.0 | 2.3 |
| Amount of THF by-produced (mol/mol-TPA) | 0.32 | 0.30 | 0.27 | 0.84 |
| Properties of PBT | | | | |
| IV (dL/g) | 0.80 | 0.80 | 0.80 | 0.80 |
| End carboxyl group concentration (μeq/g) | 20 | 21 | 20 | 14 |
| End vinyl group concentration (μeq/g) | 8 | 10 | 10 | 5 |
| Solution haze (%) | 9.5 | 14.3 | 7.5 | <0.3 |
| b value of pellets | −0.5 | 0.0 | −0.5 | 0.5 |
| Number of fisheyes | C | C | C | A |

The present patent application is based on Japanese Patent Application No. 2004-140366 filed on May 10, 2004 which is incorporated herein as a whole by reference.

What is claimed is:

1. A continuous process for producing polybutylene terephthalate, comprising: continuously subjecting terephthalic acid and 1,4-butanediol to an esterification reaction in the presence of a titanium compound catalyst using one-stage or plural-stage esterification reaction vessels, and then subjecting the resultant reaction product to a polycondensation reaction, said process satisfying the following requirements (A) to (C):

(A) a pressure (P) in at least one of said esterification reaction vessels being in the range of 20 to 90 kPa;

(B) a concentration of the titanium compound catalyst used in the esterification reaction being not more than 90 ppm, calculated as a concentration (α) by weight of titanium atom, based on the weight of the polybutylene terephthalate finally produced; and (C) the following formulae (I) and (II) being satisfied:

$$\beta = BM/TM - 0.03 \times \alpha + 0.045 \times P \quad \text{(I)}$$

$$\beta = 4.0 \text{ to } 7.0 \quad \text{(II)}$$

wherein TM is the number of moles of terephthalic acid supplied to the esterification reaction vessels per unit time; BM is the number of moles of whole 1,4-butanediol supplied continuously to the esterification reaction vessels per unit time; α is a concentration (unit: ppm) of the titanium catalyst used in the esterification reaction (calculated a concentration by weight of titanium atom based on the finally produced PBT); and P is a pressure (unit: kPa) in at least one of the esterification reaction vessels, and wherein BM/TM represented by formula (I) is not less than 2.1.

2. A process according to claim 1, wherein the pressure (P) in at least one of the esterification reaction vessels is not more than 75 kPa.

3. A process according to claim 1, wherein BM/TM represented by the formula (I) is not less than 3.1.

4. A process according to claim 1, wherein β in the formula (I) is in the range of 5.0 to 6.0.

5. A process according to claim 1, wherein the concentration (α) by weight of titanium atom is not more than 50 ppm.

6. A process according to claim 1, wherein the pressure (P) in the respective esterification reaction vessels is in the range of 50 to 70 kPa.

7. A process according to claim 1, wherein said polybutylene terephthalate has a solution haze of not more than 3% as measured by dissolving 2.7 g of the polybutylene terephthalate in 20 mL of a mixed solvent containing phenol and tetrachloroethane at a weight ratio of 3:2.

8. A process according to claim 1, wherein in the step in which terephthalic acid and 1,4-butanediol is continuously esterified with each other in the presence of the titanium compound catalyst in the esterification reaction vessels while supplying a part of the 1,4-butanediol to the esterification reaction vessels independently of the terephthalic acid, not less than 10% by weight of the titanium compound catalyst used in the esterification reaction is directly supplied to a liquid phase portion of a reaction solution in the respective esterification reaction vessels independently of the terephthalic acid, and not less than 10% by weight of the 1,4-butanediol supplied to the esterification reaction vessels independently of the terephthalic acid is directly supplied to the liquid phase portion of the reaction solution in the respective esterification reaction vessels.

9. A process according to claim 1, comprising the steps of (1) continuously subjecting the terephthalic acid and 1,4-butanediol to esterification reaction in the presence of the titanium compound catalyst in the esterification reaction vessels; (2) condensing the 1,4-butanediol distilled off from the esterification reaction vessels; and (3) re-circulating the condensed 1,4-butanediol to the esterification reaction vessels independently of the terephthalic acid, wherein said process further comprises the steps of (4) directly supplying not less than 10% by weight of the titanium compound catalyst used in the esterification reaction to the liquid phase portion of the reaction solution in the respective esterification reaction vessels independently of the terephthalic acid; and (5) directly supplying not less than 10% by weight of the 1,4-butanediol re-circulated to the esterification reaction vessels to the liquid phase portion of the reaction solution in the respective esterification reaction vessels.

10. A process according to claim 1, wherein the titanium compound catalyst is supplied in the form of a 1,4-butanediol solution containing 0.01 to 20% by weight of the titanium compound catalyst.

11. A process according to claim 10, wherein the 1,4-butanediol solution of the titanium compound catalyst has a water concentration of 0.05 to 1.0% by weight.

12. A process according to claim 1, wherein a reaction temperature used in the esterification reaction is not less than a boiling point of the 1,4-butanediol as measured under the reaction pressure (P).

13. A process according to claim 9, wherein the titanium compound catalyst used in the esterification reaction is mixed with the 1,4-butanediol re-circulated to the esterification reaction vessels, and the resultant mixture is supplied to the esterification reaction vessels.

14. A process according to claim 1, wherein the 1,4-butanediol supplied independent of the terephthalic acid has a temperature of 150 to 190° C.

15. A process according to claim 1, wherein one esterification reaction vessel in one stage is used in the esterification reaction system.

* * * * *